United States Patent
Nakamura et al.

(10) Patent No.: US 12,401,052 B2
(45) Date of Patent: Aug. 26, 2025

(54) FUEL CELL SYSTEM AND METHOD OF REPROCESSING OFF-GAS

(71) Applicant: TOKYO GAS CO., LTD., Tokyo (JP)

(72) Inventors: Kazuo Nakamura, Tokyo (JP); Takahiro Ide, Tokyo (JP); Tatsuya Nakajima, Tokyo (JP); Toru Hatae, Tokyo (JP); Tatsuki Dohkoh, Tokyo (JP); Marie Shirai, Tokyo (JP); Shunnosuke Akabane, Tokyo (JP)

(73) Assignee: TOKYO GAS CO., LTD., Tokyo (JP)

( * ) Notice: Subject to any disclaimer, the term of this patent is extended or adjusted under 35 U.S.C. 154(b) by 145 days.

(21) Appl. No.: 17/288,753

(22) PCT Filed: Oct. 28, 2019

(86) PCT No.: PCT/JP2019/042134
§ 371 (c)(1),
(2) Date: Apr. 26, 2021

(87) PCT Pub. No.: WO2020/090716
PCT Pub. Date: May 7, 2020

(65) Prior Publication Data
US 2021/0399321 A1   Dec. 23, 2021

(30) Foreign Application Priority Data
Oct. 30, 2018 (JP) ................................. 2018-204379

(51) Int. Cl.
*H01M 8/0668* (2016.01)
*C01B 3/38* (2006.01)
(Continued)

(52) U.S. Cl.
CPC ............. *H01M 8/0668* (2013.01); *C01B 3/38* (2013.01); *C01B 3/56* (2013.01);
(Continued)

(58) Field of Classification Search
CPC ............. H01M 8/0668; H01M 8/1231; H01M 8/04164; H01M 8/04761; H01M 8/0618; H01M 8/2425; C01B 3/38
See application file for complete search history.

(56) References Cited

U.S. PATENT DOCUMENTS 11,799,109 B2 * 10/2023 Herrmann ......... H01M 8/04022
2013/0108936 A1 * 5/2013 McElroy ........... H01M 8/04097
429/410

(Continued)

FOREIGN PATENT DOCUMENTS

| JP | A H11-126628 | 5/1999 |
| JP | A H11-214021 | 8/1999 |

(Continued)

OTHER PUBLICATIONS

English translation of JP2000/331,697 to Takei (Year: 2000).*

*Primary Examiner* — Ula C Ruddock
*Assistant Examiner* — Mary Grace Byram
(74) *Attorney, Agent, or Firm* — Dority & Manning, P.A.

(57) ABSTRACT

A fuel cell system including a fuel cell, an off-gas reprocessing unit that is provided downstream of the fuel cell and that at least partially removes at least one of steam or carbon dioxide from an off-gas discharged from the fuel cell, a flow passage that is provided downstream of the off-gas reprocessing unit and that allows a reprocessed off-gas discharged from the off-gas reprocessing unit to flow therethrough, and a controlling unit that modulates the reaction constant $K_{pa}$ of a reaction A with respect to the reprocessed off-gas discharged from the off-gas reprocessing unit, to 1.22 or more.

17 Claims, 2 Drawing Sheets

(51) Int. Cl.
*C01B 3/56* (2006.01)
*H01M 8/04119* (2016.01)
*H01M 8/04701* (2016.01)
*H01M 8/04746* (2016.01)
*H01M 8/0612* (2016.01)
*H01M 8/0662* (2016.01)
*H01M 8/1231* (2016.01)
*H01M 8/2425* (2016.01)
*H01M 8/249* (2016.01)
*H01M 8/12* (2016.01)

(52) U.S. Cl.
CPC ... *H01M 8/04164* (2013.01); *H01M 8/04701* (2013.01); *H01M 8/04716* (2013.01); *H01M 8/04738* (2013.01); *H01M 8/04746* (2013.01); *H01M 8/04761* (2013.01); *H01M 8/04776* (2013.01); *H01M 8/04783* (2013.01); *H01M 8/0618* (2013.01); *H01M 8/0662* (2013.01); *H01M 8/1231* (2016.02); *H01M 8/2425* (2013.01); *H01M 8/249* (2013.01); *C01B 2203/0233* (2013.01); *C01B 2203/066* (2013.01); *C01B 2203/067* (2013.01); *C01B 2203/0811* (2013.01); *C01B 2203/0838* (2013.01); *C01B 2203/1058* (2013.01); *C01B 2203/1064* (2013.01); *H01M 2008/1293* (2013.01)

(56) References Cited

U.S. PATENT DOCUMENTS

| | | | |
|---|---|---|---|
| 2016/0248111 A1* | 8/2016 | Gasda | H01M 8/0687 |
| 2017/0271701 A1* | 9/2017 | Berlowitz | H01M 8/04805 |
| 2020/0075981 A1* | 3/2020 | Jahnke | B01D 53/1425 |
| 2020/0168936 A1* | 5/2020 | Venkataraman | H01M 8/04014 |

FOREIGN PATENT DOCUMENTS

| | | |
|---|---|---|
| JP | A 2000-331697 | 11/2000 |
| JP | A 2006-031989 | 2/2006 |
| JP | A 2016-184504 | 10/2016 |
| JP | A 2018-137080 | 8/2018 |

\* cited by examiner

FUEL CELL SYSTEM AND METHOD OF REPROCESSING OFF-GAS

CROSS-REFERENCE TO RELATED APPLICATIONS

The present application is related and has right of priority to JP 2018-204379, which was filed on Oct. 30, 2018 in the Japanese Patent Office, and is a U.S. national phase entry of PCT/JP2019/042134, which was filed on Oct. 28, 2019, both of which are incorporated by reference in their entireties for all purposes.

TECHNICAL FIELD

The present invention relates to a fuel cell system and a method of reprocessing an off-gas.

BACKGROUND ART

Systems of high-temperature operation type fuel cells to be operated usually at temperatures of 600° C. or more, such as solid oxide type fuel cells and molten carbonate type fuel cells, have been examined about recycle of anode off-gases discharged from anodes of such high-temperature operation type fuel cells in order to increase efficiency. For example, a technique has been proposed which allows for an enhancement in fuel utilization of the entire system by removing steam or carbon dioxide in an anode off-gas in a solid oxide type fuel cell and thus recycling such a gas (see, for example, Patent Literature 1).

Patent Literature 1: Japanese Patent Application Laid-Open (JP-A) No. 2006-31989

SUMMARY OF INVENTION

Technical Problem

Patent Literature 1 has disclosed fuel regeneration by removing steam or carbon dioxide in the anode off-gas. However, in a case in which steam or carbon dioxide in the anode off-gas is removed, carbon monoxide in the anode off-gas may react as described below to thereby cause carbon deposition in a pipe through which the anode off-gas flows, and Patent Literature 1 has not studied any problems about such carbon deposition. In a case in which the anode off-gas is at a high temperature, the carbon monoxide easily reacts with iron or the like included in the pipe or the like, thereby resulting in the problem of carbon deposition easily occurring due to formation of a solid solution.

$$2CO \leftrightarrow CO_2 + C$$

$$CO + H_2 \leftrightarrow H_2O + C$$

For example, in a case in which carbon deposition occurs from an anode off-gas in a fuel cell system that recycles the anode off-gas by fuel regeneration, carbon monoxide and hydrogen as fuel components may be decreased, thereby resulting in a reduction in output, and/or in a case in which carbon deposition occurs in a heat exchanger, heat exchange performance may be decreased, thereby resulting in an increase in pressure loss. This may lead to a reduction in power generation efficiency of the fuel cell system. In a case in which carbon is much deposited in a pipe through which the anode off-gas flows, carbon deposited may clog the pipe, thereby causing the fuel cell system to be broken.

It is demanded in view of the foregoing to suppress carbon deposition after off-gas reprocessing in a fuel cell system.

An object of the invention is to provide a fuel cell system and a method of reprocessing an off-gas, which can allow for suppression of carbon deposition after off-gas reprocessing.

Solution to Problem

For example, the above problem will be solved by the following means.

<1> A fuel cell system comprising
a fuel cell,
an off-gas reprocessing unit that is provided downstream of the fuel cell and that at least partially removes at least one of steam or carbon dioxide from an off-gas discharged from the fuel cell,
a flow passage that is provided downstream of the off-gas reprocessing unit and that allows a reprocessed off-gas discharged from the off-gas reprocessing unit to flow therethrough, and
a controlling unit that modulates a reaction constant $K_{pa}$ of the following reaction A with respect to the reprocessed off-gas discharged from the off-gas reprocessing unit, to 1.22 or more.

Reaction A: $CO + H_2 \leftrightarrow H_2O + C$ (Solid)

Reaction constant of Reaction A: $K_{pa} = P(H_2O)/[P(CO) \times P(H_2)]$ wherein $P(H_2O)$, $P(CO)$, and $P(H_2)$ represent respective partial pressures of $H_2O$, CO, and $H_2$ in the reprocessed off-gas.

<2> The fuel cell system according to <1>, wherein the controlling unit modulates a reaction constant $K_{pb}$ of the following reaction B with respect to the reprocessed off-gas discharged from the off-gas reprocessing unit, to 0.57 or more.

Reaction B: $2CO \leftrightarrow CO_2 + C$ (Solid)

Reaction constant of Reaction B: $K_{pb} = P(CO_2)/[P(CO)]^2$ wherein $P(CO_2)$ and $P(CO)$ represent respective partial pressures of $CO_2$ and CO in the reprocessed off-gas.

<3> The fuel cell system according to <2>, wherein the controlling unit modulates the $K_{pb}$ to 0.57 or more by modulating at least one of a rate of removal of steam or a rate of removal of carbon dioxide in the off-gas reprocessing unit.

<4> The fuel cell system according to any one of <1> to <3>, wherein the controlling unit modulates the $K_{pa}$ to 1.22 or more by modulating at least one of a rate of removal of steam or a rate of removal of carbon dioxide in the off-gas reprocessing unit.

<5> The fuel cell system according to any one of <1> to <4>, wherein the off-gas reprocessing unit comprises a condenser that removes steam of the off-gas by condensation.

<6> The fuel cell system according to <5>, wherein the controlling unit is capable of modulating at least one of a condensation temperature of the condenser or a pressure in the condenser.

<7> The fuel cell system according to any one of <1> to <6>, wherein
the fuel cell is a first fuel cell, and
the fuel cell system further comprises a second fuel cell to which the reprocessed off-gas flowing through the flow passage is supplied.

<8> The fuel cell system according to any one of <1> to <6>, wherein the reprocessed off-gas flowing through the flow passage is supplied to the fuel cell.

<9> The fuel cell system according to any one of <1> to <8>, wherein the fuel cell system further comprises a reformer that reforms a raw material gas and generates a fuel gas, or the raw material gas is reformed in the fuel cell, thereby generating a fuel gas.

<10> The fuel cell system according to any one of <1> to <8>, wherein the fuel cell system satisfies the following (1) or (2):
  (1) the fuel cell system further comprises a reformer that reforms a raw material gas and generates a fuel gas, and at least one of a reforming temperature of the reformer or a fuel utilization of the fuel cell is controlled; or
  (2) the controlling unit controls the fuel utilization of the fuel cell.

<11> A method of reprocessing an off-gas, comprising using a fuel cell system comprising
  a fuel cell,
  an off-gas reprocessing unit that is provided downstream of the fuel cell and that at least partially removes at least one of steam or carbon dioxide from an off-gas discharged from the fuel cell, and
  a flow passage that is provided downstream of the off-gas reprocessing unit and that allows a reprocessed off-gas discharged from the off-gas reprocessing unit to flow therethrough,
  thereby modulating a reaction constant $K_{pa}$ of the following reaction A with respect to the reprocessed off-gas discharged from the off-gas reprocessing unit, to 1.22 or more.

Reaction A: $CO + H_2 \leftrightarrow H_2O + C$ (Solid)

Reaction constant of Reaction A: $K_{pa} = P(H_2O)/[P(CO) \times P(H_2)]$ wherein $P(H_2O)$, $P(CO)$, and $P(H_2)$ represent respective partial pressures of $H_2O$, $CO$, and $H_2$ in the reprocessed off-gas.

<12> The method of reprocessing an off-gas according to <11>, wherein a reaction constant $K_{pb}$ of the following reaction B with respect to the reprocessed off-gas discharged from the off-gas reprocessing unit, is modulated to 0.57 or more.

Reaction B: $2CO \leftrightarrow CO_2 + C$ (Solid)

Reaction constant of Reaction B: $K_{pb} = P(CO_2)/[P(CO)]^2$ wherein $P(CO_2)$ and $P(CO)$ represent respective partial pressures of $CO_2$ and $CO$ in the reprocessed off-gas.

Advantageous Effect Invention

According to the invention, a fuel cell system and a method of reprocessing an off-gas can be provided which can allow for suppression of carbon deposition after off-gas reprocessing.

DESCRIPTION OF EMBODIMENTS

A numerical value range represented by "(from) . . . to . . . " in the present disclosure means any range including respective numerical values described before and after "to" as a lower limit value and an upper limit value, respectively.

An upper limit value or a lower limit value described with respect to one numerical value range as a numerical value range described stepwise in the disclosure may be replaced with an upper limit value or a lower limit value of other numerical value range described stepwise. At least one of an upper limit or a lower limit in a numerical value range described in the disclosure may be replaced with any value represented in Examples.

The "material hardly forming a solid solution with carbon" in the disclosure refers to any material more hardly forming a solid solution with carbon than Fe, Ni, and Co in a temperature range (for example, 700° C. or less) of a reprocessed off-gas flowing through a flow passage. Herein, the "material hardly forming a solid solution with carbon" encompasses a "material not forming any solid solution with carbon".

The reaction constant of a reaction A and the reaction constant of a reaction B may be calculated from the gas volume ratio of $H_2O$, $CO$, and $H_2$ and the gas volume ratio of $CO_2$ and $CO$, respectively, in a reprocessed off-gas.

First Embodiment

Figure 1:
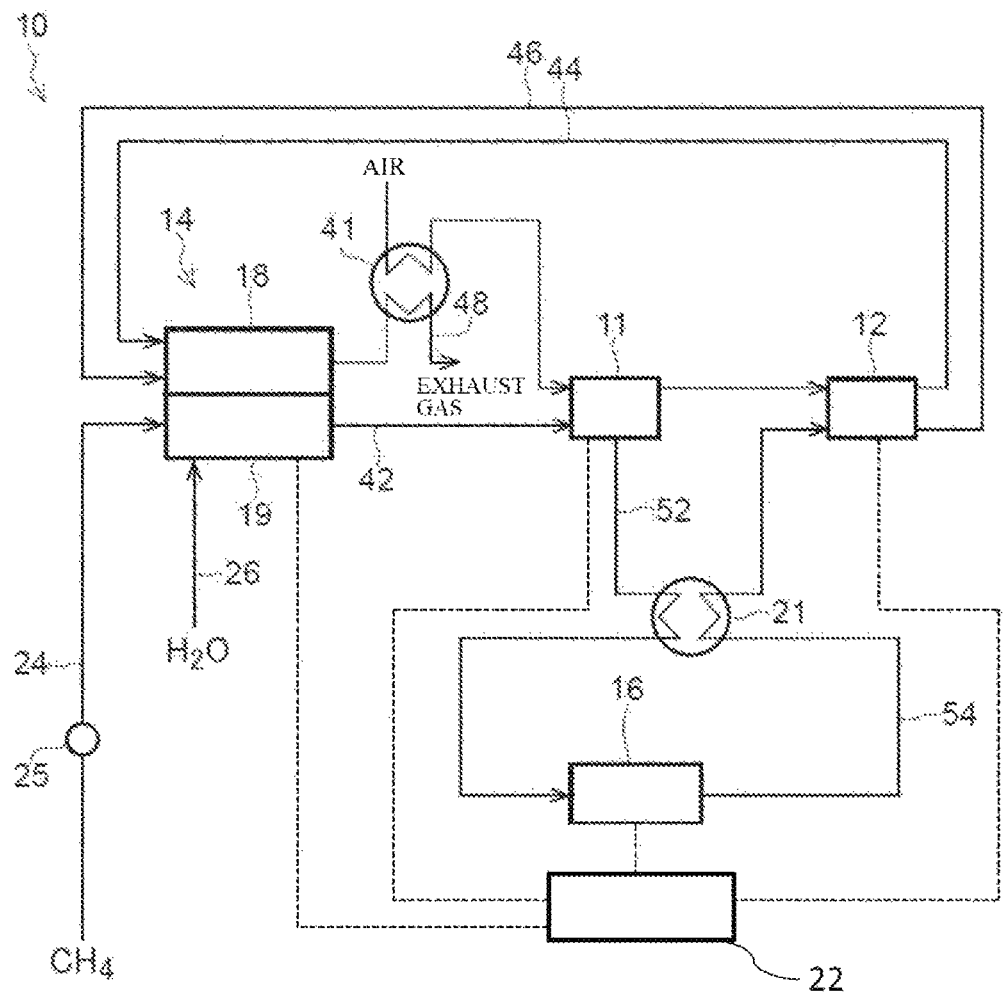
FIG. 1 is a schematic configuration view illustrating a fuel cell system according to a first embodiment.

Hereinafter, one embodiment of the fuel cell system of the invention is described with reference to FIG. 1. FIG. 1 is a schematic configuration view illustrating a fuel cell system according to a first embodiment. A fuel cell system 10 according to the first embodiment includes a first fuel cell 11 in which power generation is performed by using a fuel gas, an anode off-gas reprocessing unit 16 (off-gas reprocessing unit) that at least partially removes at least one of carbon dioxide or steam from an anode off-gas including an unreacted fuel gas discharged from the first fuel cell 11, a reprocessed off-gas passage 54 (flow passage) that is provided downstream of the anode off-gas reprocessing unit 16 and that allows for flow through of the reprocessed off-gas discharged from the anode off-gas reprocessing unit 16, and a controlling unit 22 that modulates the reaction constant $K_{pa}$ of the following reaction A with respect to the reprocessed off-gas discharged from the anode off-gas reprocessing unit 16, to 1.22 or more.

Reaction A: $CO + H_2 \leftrightarrow H_2O + C$ (Solid)

Reaction constant of Reaction A: $K_{pa} = P(H_2O)/[P(CO) \times P(H_2)]$ wherein $P(H_2O)$, $P(CO)$, and $P(H_2)$ represent respective partial pressures of $H_2O$, $CO$, and $H_2$ in the reprocessed off-gas.

The anode off-gas reprocessing unit 16 in the fuel cell system 10 according to the embodiment at least partially removes least one of carbon dioxide or steam from the anode off-gas and thus generates the reprocessed off-gas. Since carbon deposition in a gas including carbon monoxide is suppressed in the presence of steam, steam is removed, thereby easily causing carbon deposition to occur. For example, in a case in which steam is removed as represented in the above-mentioned reaction A, the equilibrium is transferred in a direction in which steam is generated, and carbon deposition easily occurs. In a case in which carbon dioxide in a gas including carbon monoxide and carbon dioxide is removed as represented in a reaction B described below, the equilibrium is transferred in a direction in which carbon deposition occurs. In a case in which steam is removed in consideration of a water gas shift reaction ($CO+H_2O \leftrightarrow CO_2+H_2$), the equilibrium is transferred in a direction in which carbon monoxide is generated, whereby the equilibrium is transferred in a direction in which carbon deposition occurs according to a reaction B described below. Thus, carbon deposition easily occurs in the reprocessed off-gas as compared with the anode off-gas.

In a case in which the flow passage through which the reprocessed off-gas flows is configured by including iron, cobalt, nickel, or the like, carbon generated according to the reaction A, the reaction B, or the like is incorporated to iron, cobalt, nickel, or the like, thereby easily forming a solid solution, and more easily forming a solid solution in particular in a case in which the reprocessed off-gas is at a high temperature. Thus, a problem is that carbon is easily grown on the surface of the flow passage and as a result, carbon is easily deposited on the surface of the flow passage.

The reaction constant $K_{pa}$ of the reaction A with respect to the reprocessed off-gas discharged from the anode off-gas reprocessing unit 16 in the fuel cell system 10 according to the embodiment is modulated to 1.22 or more by the controlling unit 22. Thus, carbon deposition in the reprocessed off-gas passage 54 hardly occurs, and carbon deposition after off-gas reprocessing can be suppressed. In particular, even in a case in which the reprocessed off-gas is at a high temperature (for example, from 400° C. to 700° C.) and the reprocessed off-gas passage 54 is configured by including iron, cobalt, nickel, or the like, thereby causing carbon to be easily deposited, carbon deposition in the reprocessed off-gas passage 54 can be suppressed.

The fuel cell system 10 according to the embodiment is a multistage fuel cell system including the first fuel cell 11 and a second fuel cell 12. A circulation type fuel cell system is required to partially discharge an anode off-gas discharged from an anode outside a circulation system in order to suppress an increase in concentration of carbon dioxide in the circulation system, and an unreacted fuel gas is also here partially discharged outside the circulation system. On the other hand, the multistage fuel cell system allows a fuel gas included in an anode off-gas discharged from the anode of a fuel cell at a pre-stage to be supplied to the anode of a fuel cell at a post-stage without any partial discharge of the fuel gas outside the system. Thus, the multistage fuel cell system can be enhanced in fuel utilization as compared with the circulation type fuel cell system, and in such a case, can achieve a high power generation efficiency.

The controlling unit 22 in the fuel cell system 10 according to the embodiment preferably modulates the above-mentioned reaction constant $K_{pa}$ of the reaction A to 1.5 or more, more preferably 1.6 or more, still more preferably 3.0 or more from the viewpoint of allowing carbon deposition in the reprocessed off-gas passage 54 to more hardly occur. The controlling unit may also modulate the above-mentioned reaction constant $K_{pa}$ of the reaction A to 40 or less, or 25 or less, from the viewpoint of allowing for a more enhancement in power generation efficiency by fuel regeneration.

The controlling unit 22 in the fuel cell system 10 according to the embodiment preferably modulates the reaction constant $K_{pb}$ of the following reaction B with respect to the reprocessed off-gas discharged from the anode off-gas reprocessing unit 16, to 0.57 or more, from the viewpoint of allowing carbon deposition in the reprocessed off-gas passage 54 to more hardly occur.

Reaction B: $2CO \leftrightarrow CO_2+C$ (Solid)

Reaction constant of Reaction B: $K_{pb}=P(CO_2)/[P(CO)]^2$ wherein $P(CO_2)$ and $P(CO)$ represent respective partial pressures of $CO_2$ and $CO$ in the reprocessed off-gas.

The controlling unit 22 in the fuel cell system 10 according to the embodiment preferably modulates the reaction constant $K_{pb}$ of the reaction B with respect to the reprocessed off-gas discharged from the anode off-gas reprocessing unit 16, to 43 or more, more preferably 45 or more, from the viewpoint of allowing carbon deposition in the reprocessed off-gas passage 54 to further hardly occur. The controlling unit may also modulate the above-mentioned reaction constant $K_{pb}$ of the reaction B to 80 or less, or 70 or less, from the viewpoint of allowing for a more enhancement in power generation efficiency by fuel regeneration.

The reaction constant $K_{pa}$ of the reaction A and the reaction constant $K_{pa}$ of the reaction B in the fuel cell system 10 can be each modulated to a predetermined numerical value by modulating the rate of each gas included in the reprocessed off-gas. The rate of each gas included in the reprocessed off-gas can be appropriately modulated by controlling operating conditions of a reformer 14, the first fuel cell 11, the anode off-gas reprocessing unit 16, and the like, as described below, and/or modulating the amount of steam for use in reforming in the reformer 14, and the composition and the amount of a raw material gas such as methane.

Hereinafter, each configuration of the fuel cell system 10 according to the embodiment will be described.
(Raw Material Gas Supply Passage)

The fuel cell system 10 according to the embodiment includes a raw material gas supply passage 24 that supplies a raw material gas to a reforming unit 19 of the reformer 14, and a blower 25 for allowing the raw material gas to flow therethrough is placed on the raw material gas supply passage 24.

The raw material gas flowing through the raw material gas supply passage 24 is not particularly limited as long as the gas is any gas that can be reformed, and examples thereof include hydrocarbon fuel. Examples of the hydrocarbon fuel include a natural gas, an LP gas (liquefied petroleum gas), a coal reformed gas, a lower hydrocarbon gas, and a biogas. Examples of the lower hydrocarbon gas include any gas of lower hydrocarbon having 4 or less carbon atoms, such as methane, ethane, ethylene, propane, or butane, and in particular, methane is preferable. The hydrocarbon fuel may be a mixture of the above-mentioned lower hydrocarbon gases, may be a mixture of the above-mentioned lower hydrocarbon gas with any gas such as a natural gas, a city gas, or an LP gas, or may be any gas obtained by adding hydrogen, carbon monoxide, carbon dioxide, or the like to the above-mentioned gas.
(Steam Supply Passage)

The fuel cell system 10 according to the embodiment includes a steam supply passage 26 that supplies steam to the reforming unit 19 of the reformer 14. Such steam flowing through the steam supply passage 26 may be derived from steam removed in the anode off-gas reprocessing unit 16 described below, or may be derived from steam included in an exhaust gas described below.
(Reformer)

The fuel cell system 10 according to the embodiment includes the reformer 14 that steam reforms a raw material gas, thereby generating a fuel gas. The reformer 14 is configured by, for example, a combustion unit 18 in which a burner or a combustion catalyst, or both thereof are disposed, and a reforming unit 19 including a reforming catalyst.

The reforming unit 19 is connected to the raw material gas supply passage 24 at the upstream, and is connected to a fuel gas supply passage 42 at the downstream. Thus, a raw material gas such as methane is supplied to the reforming unit 19 through the raw material gas supply passage 24, the raw material gas is steam reformed in the reforming unit 19, and thereafter a fuel gas generated is supplied to the first fuel cell 11 through the fuel gas supply passage 42.

The combustion unit 18 is connected to an air supply passage 44 and an off-gas passage 46 at the upstream, and is connected to an exhaust passage 48 at the downstream. The combustion unit 18 combusts a mixed gas of a gas (cathode off-gas) including unreacted oxygen discharged from the cathode of a second fuel cell 12 and supplied through the air supply passage 44, and an anode off-gas supplied through the off-gas passage 46, thereby heating the reforming catalyst in the reforming unit 19. The exhaust gas from the combustion unit 18 flows through the exhaust passage 48.

Since steam reforming occurring in the reforming unit 19 is associated with large endotherm, heat is required to be externally supplied for progression of a reaction and thus the reforming unit 19 is preferably heated by combustion heat generated in the combustion unit 18. Alternatively, the reforming unit 19 may be heated by using heat released from each fuel cell without no combustion unit 18 placed, or the reforming unit 19 may be heated by using heat released from each fuel cell with the combustion unit 18 placed.

In a case in which a hydrocarbon gas represented by $C_nH_m$ (both n and m are positive real numbers), as the raw material gas, is steam reformed, carbon monoxide and hydrogen are generated in the reforming unit 19, according to a reaction of the following Formula (a).

$$C_nH_m + nH_2O \rightarrow nCO + [(m/2)+n]H_2 \quad (a)$$

In a case in which methane as one example of the raw material gas is steam reformed, carbon monoxide and hydrogen are generated in the reforming unit 19, according to a reaction of the following Formula (b).

$$CH_4 + H_2O \rightarrow CO + 3H_2 \quad (b)$$

The reforming catalyst placed in the reforming unit 19 is not particularly limited as long as the catalyst serves as a catalyst of a steam reforming reaction, and is preferably a steam reforming catalyst including at least one of Ni, Rh, Ru, Ir, Pd, Pt, Re, Co, Fe, or Mo as a catalytic metal.

The ratio S/C of steam/carbon, which is the ratio of the number S of steam molecules per unit time, supplied to the reforming unit 19 of the reformer 14, and the number C of carbon atoms in the raw material gas per unit time, supplied to the reforming unit 19 of the reformer 14, is preferably from 1.5 to 3.5, more preferably from 2.0 to 3.0, still more preferably from 2.0 to 2.5. The ratio S/C of steam/carbon is in the range, whereby the raw material gas is efficiently steam reformed and a fuel gas including hydrogen and carbon monoxide is generated. Furthermore, carbon deposition in the fuel cell system 10 can be suppressed and reliability of the fuel cell system 10 can be enhanced.

The combustion unit 18 preferably heats the reforming unit 19 to from 600° C. to 800° C., more preferably from 600° C. to 700° C., from the viewpoint of efficiently performing steam reforming.

The fuel cell system (in particular, fuel cell system including a high-temperature type fuel cell) according to the invention is not required to have a configuration in which the reformer is attached outside the first fuel cell, and may have a configuration in which the raw material gas and steam are directly supplied to the first fuel cell, steam reforming (internal reforming) is performed inside the first fuel cell, and a fuel gas generated is used for power generation in the first fuel cell. In particular, in a case in which the first fuel cell is a high-temperature type fuel cell, the reaction temperature therein is a high temperature of from 600° C. to 800° C., and thus steam reforming can be performed in the first fuel cell.

The exhaust gas flowing through the exhaust passage 48 is cooled by a heat exchanger 41, and thus water generated by condensation may be recovered and used for the above-mentioned steam reforming.

The air supply passage 44 is a passage through which a gas (cathode gas) including oxygen such as air and a gas (cathode off-gas) including unreacted oxygen flow, and the heat exchanger 41 is placed on the air supply passage 44. The heat exchanger 41 performs heat exchange between a cathode gas flowing through the air supply passage 44 located upstream of the first fuel cell 11 and an exhaust gas flowing through the exhaust passage 48. Thus, the exhaust gas flowing through the exhaust passage 48 is cooled, and air flowing through the air supply passage 44 located upstream of the first fuel cell 11 is heated to a temperature suitable for the operation temperature of the first fuel cell 11 and then supplied to the cathode of the first fuel cell 11.

(First Fuel Cell)

The fuel cell system 10 according to the embodiment includes the first fuel cell 11 in which power generation is performed by using a fuel gas supplied from the reformer 14 through the fuel gas supply passage 42. The first fuel cell 11 may be, for example, a fuel cell including an air electrode (cathode), an electrolyte, and a fuel electrode (anode), or a fuel cell stack obtained by layering a plurality of fuel cells. Examples of the first fuel cell include a high-temperature type fuel cell to be operated at from about 600° C. to 1000° C., for example, a solid oxide type fuel cell to be operated at from about 650° C. to 1000° C. or a molten carbonate type fuel cell to be operated at from about 600° C. to 700° C.

In a case in which the first fuel cell 11 is a solid oxide type fuel cell, air is supplied to the cathode (not illustrated) of the first fuel cell 11 through the air supply passage 44. Air is supplied to the cathode, whereby a reaction represented by the following Formula (c) occurs and an oxygen ion here migrates in a solid oxide electrolyte (not illustrated).

$$O_2 + 4e^- \rightarrow 2O^{2-} \quad (c)$$

In a case in which the first fuel cell 11 is a solid oxide type fuel cell, a fuel gas including hydrogen and carbon monoxide is supplied to the anode (not illustrated) of the first fuel cell 11 through the fuel gas supply passage 42. An oxygen ion that migrates in the solid oxide electrolyte allows reactions represented by the following Formula (d) and Formula (e) to occur at the interface between the anode and the solid oxide electrolyte.

$$H_2 + O^{2-} \rightarrow H_2O + 2e^- \quad (d)$$

$$CO + O^{2-} \rightarrow CO_2 + 2e^- \quad (e)$$

In a case in which the first fuel cell 11 is a molten carbonate type fuel cell, a gas including oxygen and carbon dioxide is supplied to the cathode (not illustrated) of the first fuel cell 11 through the air supply passage 44. The gas including oxygen and carbon dioxide is supplied to the cathode, whereby a reaction represented by the following Formula (f) occurs and a carbonate ion here migrates in an electrolyte (not illustrated).

$$O_2 + 2CO_2 + 4e^- \rightarrow 2CO_3^{2-} \quad (f)$$

In a case in which the first fuel cell 11 is a molten carbonate type fuel cell, a fuel gas including hydrogen is supplied to the anode (not illustrated) of the first fuel cell 11 through the fuel gas supply passage 42. Hydrogen receives an electron from a carbonate ion that migrates in the electrolyte, at the interface between the anode and the electrolyte, whereby a reaction represented by the following Formula (g) occurs.

$$H_2 + CO_3^{2-} \rightarrow H_2O + CO_2 + 2e^- \quad (g)$$

In a case in which the first fuel cell 11 is a molten carbonate type fuel cell, steam generated and carbon monoxide supplied through the fuel gas supply passage 42 are reacted, thereby allowing a reaction represented by the following Formula (h) to occur, thereby generating hydrogen and carbon dioxide. Such hydrogen generated is consumed by the above-mentioned reaction of Formula (g).

$$CO + H_2O \rightarrow H_2 + CO_2 \quad (h)$$

An electrochemical reaction of the fuel gas in the first fuel cell 11, as represented by Formula (d), Formula (e), Formula (g), and Formula (h), allows steam and carbon dioxide to be mainly generated in the solid oxide type fuel cell and the molten carbonate type fuel cell. An electron generated in the anode migrates through an external circuit toward the cathode. Such an electron thus migrates from the anode toward the cathode, whereby power generation is performed in the first fuel cell 11.

A cathode off-gas discharged from the cathode is supplied to the cathode (not illustrated) of the second fuel cell 12 through the air supply passage 44 located downstream.

On the other hand, an anode off-gas including an unreacted fuel gas, discharged from the anode, is supplied to the anode off-gas reprocessing unit 16 through an off-gas passage 52. The anode off-gas including an unreacted fuel gas is here a mixed gas including hydrogen, carbon monoxide, carbon dioxide, steam, and the like.

A heat exchanger 21 is placed on the off-gas passage 52 and a reprocessed off-gas passage 54, and the heat exchanger 21 performs heat exchange between an anode off-gas flowing through the off-gas passage 52 and a reprocessed off-gas flowing through the reprocessed off-gas passage 54. Thus, the anode off-gas flowing through the off-gas passage 52 is cooled to a preferable temperature in at least partial removal of at least one of carbon dioxide or steam by the anode off-gas reprocessing unit 16, and the reprocessed off-gas flowing through the reprocessed off-gas passage 54 is heated to a temperature suitable for the operation temperature of the second fuel cell 12. Thus, the entire system is more enhanced in power generation efficiency and heat efficiency.

(Anode Off-Gas Reprocessing Unit)

The fuel cell system 10 according to the embodiment includes the anode off-gas reprocessing unit 16 that at least partially separates at least one of carbon dioxide or steam from an anode off-gas including an unreacted fuel gas discharged from the first fuel cell 11. The anode off-gas is supplied to the anode off-gas reprocessing unit 16 and at least one of carbon dioxide or steam is at least partially separated, thereby generating a reprocessed off-gas.

Examples of the anode off-gas reprocessing unit 16 include an absorption material, an adsorbent, a separation membrane, a condenser, and an absorption liquid.

The absorption material may be any material that can absorb at least one of carbon dioxide or steam in the anode off-gas, and examples thereof include a water absorption material and a carbon dioxide absorption material.

The adsorbent may be any adsorbent that can adsorb at least one of carbon dioxide or steam in the anode off-gas, and examples thereof include a water adsorbent and a carbon dioxide adsorbent.

The separation membrane may be any membrane that can separate at least one of carbon dioxide or steam in the anode off-gas, and examples thereof include an organic polymer membrane, an inorganic material membrane, an organic polymer-inorganic material composite membrane, and a liquid membrane. The separation membrane is preferably a glass-like polymer membrane, a rubber-like polymer membrane, an ion exchange resin membrane, an alumina membrane, a silica membrane, a carbon membrane, a zeolite membrane, a ceramic membrane, an aqueous amine membrane, or an ion liquid membrane. The separation membrane may be supported by a porous support.

The rate of removal of carbon dioxide and steam in the anode off-gas with the absorption material, the adsorbent, and the separation membrane can be appropriately modulated by modulating the flow rate of the anode off-gas, the temperature of the anode off-gas, or the like.

In a case in which the separation membrane is used, a sweep gas may be supplied to a permeation section in order to enhance separation efficiency.

The condenser may be any condenser that can remove steam from the anode off-gas by condensation. The rate of removal of steam in the anode off-gas in the condenser can be appropriately modulated by modulating the condensation temperature, the pressure in the condenser, or the like.

The absorption liquid may be any liquid that can absorb carbon dioxide in the anode off-gas, and examples thereof include an alkaline aqueous solution of amine or the like. The absorption liquid may also be any liquid that can be contacted with the anode off-gas, thereby absorbing carbon dioxide, and thereafter heated, thereby separating carbon dioxide, like an alkaline aqueous solution of amine or the like.

The absorption material, the adsorbent, the separation membrane, the condenser, and the like may be appropriately combined, thereby removing at least partially carbon dioxide and at least partially steam, from the anode off-gas. For example, the anode off-gas reprocessing unit 16 may be a combination of a separation membrane that at least partially removes carbon dioxide, and the condenser.

The steam removed with the absorption material, the adsorbent, the separation membrane, the condenser, and the like may be used in the above-mentioned steam reforming.

(Reprocessed Off-Gas Passage)

The fuel cell system 10 according to the embodiment includes a reprocessed off-gas passage 54 that is provided downstream of the anode off-gas reprocessing unit 16 and that allows a reprocessed off-gas discharged from the off-gas reprocessing unit 16 to flow therethrough. The reprocessed off-gas flowing through the reprocessed off-gas passage 54 is supplied to the second fuel cell 12 described below.

The material included in the reprocessed off-gas passage 54 is not particularly limited, and may include, for example, Fe, Ni, and Co. The total content rate of Fe, Ni, and Co in the reprocessed off-gas passage 54 may be more than 50% by mass, the reprocessed off-gas passage 54 includes Fe, and the content rate of Fe may be more than 50% by mass. Even in a case in which the amount of Fe, Ni, and Co that form a solid solution with carbon exceeds a certain amount, carbon is hardly grown on the surface of the flow passage, and as a result, carbon deposition on the surface of the flow passage tends to be able to be suppressed.

(Controlling Unit)

The fuel cell system 10 according to the embodiment includes the controlling unit 22 that modulates the reaction constant $K_{pa}$ of the above-mentioned reaction A with respect to the reprocessed off-gas discharged from the anode off-gas reprocessing unit 16, to 1.22 or more.

The controlling unit 22 is configured to control the composition of the raw material gas, the amount of the raw material gas supplied, the composition of the fuel gas, the amount of the fuel gas supplied, the amount of steam supplied, and operating conditions of the blower 25, the reformer 14, the first fuel cell 11, the anode off-gas reprocessing unit 16, the second fuel cell 12, and the like, and can modulate the above-mentioned reaction constant $K_{pa}$ of the reaction A to 1.22 or more by controlling such conditions. More specifically, the controlling unit 22 can modulate the rate of each gas in the reprocessed off-gas by modulating the reforming temperature of the reformer 14, the fuel utilization of the first fuel cell 11, the rate of removal of steam and the rate of removal of carbon dioxide in the anode off-gas reprocessing unit 16, and the like, and thus the above-mentioned reaction constant $K_{pa}$ of the reaction A can be modulated to 1.22 or more.

The controlling unit 22 may be configured to modulate the above-mentioned reaction constant $K_{pa}$ of the reaction B with respect to the reprocessed off-gas discharged from the anode off-gas reprocessing unit 16, to 0.57 or more. The above-mentioned reaction constant $K_{pa}$ of the reaction B may be modulated by the same method as in the above-mentioned reaction constant $K_{pa}$ of the reaction A.

(Second Fuel Cell)

The fuel cell system 10 according to the embodiment includes the second fuel cell 12 that is disposed downstream of the anode off-gas reprocessing unit 16 and the reprocessed off-gas passage 54 and that performs power generation with the reprocessed off-gas. The second fuel cell 12 may be, for example, a fuel cell including an air electrode (cathode), an electrolyte, and a fuel electrode (anode), or a fuel cell stack obtained by layering a plurality of fuel cells. The second fuel cell 12 has the same configuration as that of the above-mentioned first fuel cell 11, and the description with respect to any common matter is omitted.

The second fuel cell 12 in the fuel cell system 10 performs power generation by using the reprocessed off-gas. Thus, the second fuel cell 12 not only can be enhanced in theoretical voltage due to the difference in partial pressure of oxygen between electrodes, but also can be reduced in concentration overvoltage due to at least one of carbon dioxide or steam in the gas, and can exhibit high performance particularly at a high current density. Accordingly, the fuel cell system 10 can achieve a high power generation efficiency as compared with a multistage fuel cell system that performs power generation by using an anode off-gas in which neither steam nor carbon dioxide is separated, in a fuel cell at a post-stage.

An anode off-gas discharged from the anode of the second fuel cell 12 is supplied to the combustion unit 18 of the reformer 14 through the off-gas passage 46, and a cathode off-gas discharged from the cathode of the second fuel cell 12 is supplied to the combustion unit 18 of the reformer 14 through the air supply passage 44 located downstream.

(Variant)

While the air supply passage 44 in the embodiment is located in series and thus air is supplied to the first fuel cell 11 and then the cathode off-gas discharged from the first fuel cell 11 is supplied to the second fuel cell 12, the air supply passage 44 may be located in parallel. In other words, a configuration may be adopted in which the air supply passage 44 through which air flows is branched, thereby supplying air to the respective cathodes of the first fuel cell 11 and the second fuel cell 12.

While the fuel cell system including the two fuel cells (first fuel cell 11 and second fuel cell 12) is described in the embodiment, the invention is not limited thereto, and may provide a fuel cell system including three or more fuel cells, for example, including a third fuel cell located downstream of the second fuel cell 12. Herein, a configuration may be adopted in which an anode off-gas discharged from the anode of the third fuel cell is supplied to the combustion unit of the reformer through an off-gas passage, or a configuration may be adopted in which a cathode off-gas discharged from the cathode of the third fuel cell is supplied to the combustion unit of the reformer through an air supply passage located downstream.

While the configuration in which the raw material gas is steam reformed is described in the embodiment, the invention is not limited thereto, and a configuration may be adopted in which the raw material gas is reformed by, for example, carbon dioxide reforming, partial oxidation reforming, or shift reaction reforming. For example, the reformer may have a configuration in which at least one of carbon dioxide reforming or steam reforming of the raw material gas is performed, may have a configuration in which the fuel gas is generated by partial oxidation reforming, or may have a configuration in which reforming is accompanied by a shift reaction. A configuration may also be adopted in which the raw material gas and carbon dioxide are directly supplied to the first fuel cell, carbon dioxide reforming (internal reforming) is performed in the first fuel cell, and the fuel gas generated is used for power generation in the first fuel cell.

The flow passage through which the reprocessed off-gas flows may include a material hardly forming a solid solution with carbon on at least a portion of the surface thereof, or at least a portion of the surface thereof may be covered with a layer (coating layer) including a material hardly forming a solid solution with carbon. In a case in which the flow passage through which the reprocessed off-gas flows is configured by including iron or the like, carbon generated according to the reaction A, the reaction B, and the like is incorporated to iron or the like, thereby easily forming a solid solution. Thus, carbon tends to be easily grown on the surface of the flow passage and as a result, carbon tends to be easily deposited on the surface of the flow passage. On the other hand, a material hardly forming a solid solution with carbon is present on the surface of the flow passage through which the reprocessed off-gas flows, whereby carbon deposition hardly occurs in the flow passage and carbon deposition after off-gas reprocessing can be suitably suppressed.

The material hardly forming a solid solution with carbon may include at least one of oxide or nitride. The oxide is preferably at least one selected from the group consisting of $Al_2O_3$, $SiO_2$, MgO, $ZrO_2$ (preferably stabilized zirconia such as yttria-stabilized zirconia), and $3Al_2O_3$-$2SiO_2$ (mullite). The nitride is preferably at least one selected from the group consisting of AlN, $Si_3N_4$, TiN, c-$W_2N$, h-WN, and CrN. In particular, the nitride is more preferably AlN or $Si_3N_4$ from the viewpoint of a high heat conductivity and excellent thermal shock resistance.

The material hardly forming a solid solution with carbon may include at least one element selected from the group consisting of W, Nb, Mo, Ti, and Si.

The flow passage preferably does not include Fe, Ni, and Co or the total content rate of Fe, Ni, and Co in the flow passage is preferably 50% by mass or less, more preferably 30% by mass or less, still more preferably 10% by mass or less. Fe, Ni, and Co forming a solid solution with carbon are present in a certain amount or less, whereby carbon is hardly grown on the surface of the flow passage and as a result, carbon deposition tends to be able to be more suitably suppressed on the surface of the flow passage.

In a case in which at least a portion of the surface of the flow passage is covered with a layer including the material hardly forming a solid solution with carbon, the total content rate of Fe, Ni, and Co in the flow passage means a numerical value obtained by multiplying 100 by the ratio of the total mass of Fe, Ni, and Co in the flow passage including the layer to the total mass of the flow passage including the layer ([the total mass of Fe, Ni, and Co in the layer+the total mass of Fe, Ni, and Co in a flow passage from which the layer is removed]/the total mass of the flow passage including the layer).

In a case in which at least a portion of the surface in the flow passage includes the material hardly forming a solid solution with carbon, the surface preferably does not include Fe, Ni, and Co or the total content rate of Fe, Ni, and Co in the surface is preferably 50% by mass or less, more preferably 30% by mass or less, still more preferably 10% by mass or less from the viewpoint of suppression of carbon deposition.

In a case in which at least a portion of the surface in the flow passage is covered with the layer including the material hardly forming a solid solution with carbon, the layer preferably does not include Fe, Ni, and Co or the total content rate of Fe, Ni, and Co in the layer is preferably 50% by mass or less, more preferably 30% by mass or less, still more preferably 10% by mass or less from the viewpoint of suppression of carbon deposition.

The arithmetic average roughness of the surface including the material hardly forming a solid solution with carbon or the arithmetic average roughness of the surface of the coating layer is preferably 100 µm or less, more preferably 10 µm or less, still more preferably 1 µm or less. Thus, the surface in the flow passage is less corrugated, and thus flow of the reprocessed off-gas is hardly disrupted and carbon deposition on such a corrugated section can be suppressed.

The arithmetic average roughness Ra can be measured with a contact type surface roughness meter (for example, Surftest SJ-301 manufactured by Mitutoyo Corporation).

The fuel cell system 10 according to the embodiment may satisfy at least one of a condition in which at least a portion of the surface in the reprocessed off-gas passage 54 located downstream relative to the heat exchanger 21 includes the material hardly forming a solid solution with carbon or a condition in which at least a portion of the surface in the reprocessed off-gas passage 54 located downstream relative to the heat exchanger 21 is covered with the layer (coating layer) including the material hardly forming a solid solution with carbon. Since carbon deposition tends to more easily occur as the reprocessed off-gas is at a higher temperature, a configuration may be thus adopted in which carbon deposition hardly occurs in the reprocessed off-gas passage 54 located downstream relative to the heat exchanger 21.

The fuel cell system may satisfy at least one of a condition in which the surface in the reprocessed off-gas passage 54 located downstream relative to the heat exchanger 21 includes the material hardly forming a solid solution with carbon or a condition in which the surface in the reprocessed off-gas passage 54 located downstream relative to the heat exchanger 21 is covered with the coating layer. Alternatively, the fuel cell system may satisfy at least one of a condition in which the surface of a flow passage through which the reprocessed off-gas in the heat exchanger 21 flows includes the material hardly forming a solid solution with carbon or a condition in which the surface of a flow passage through which the reprocessed off-gas in the heat exchanger 21 flows is covered with the layer including the material hardly forming a solid solution with carbon.

Second Embodiment

Figure 2:
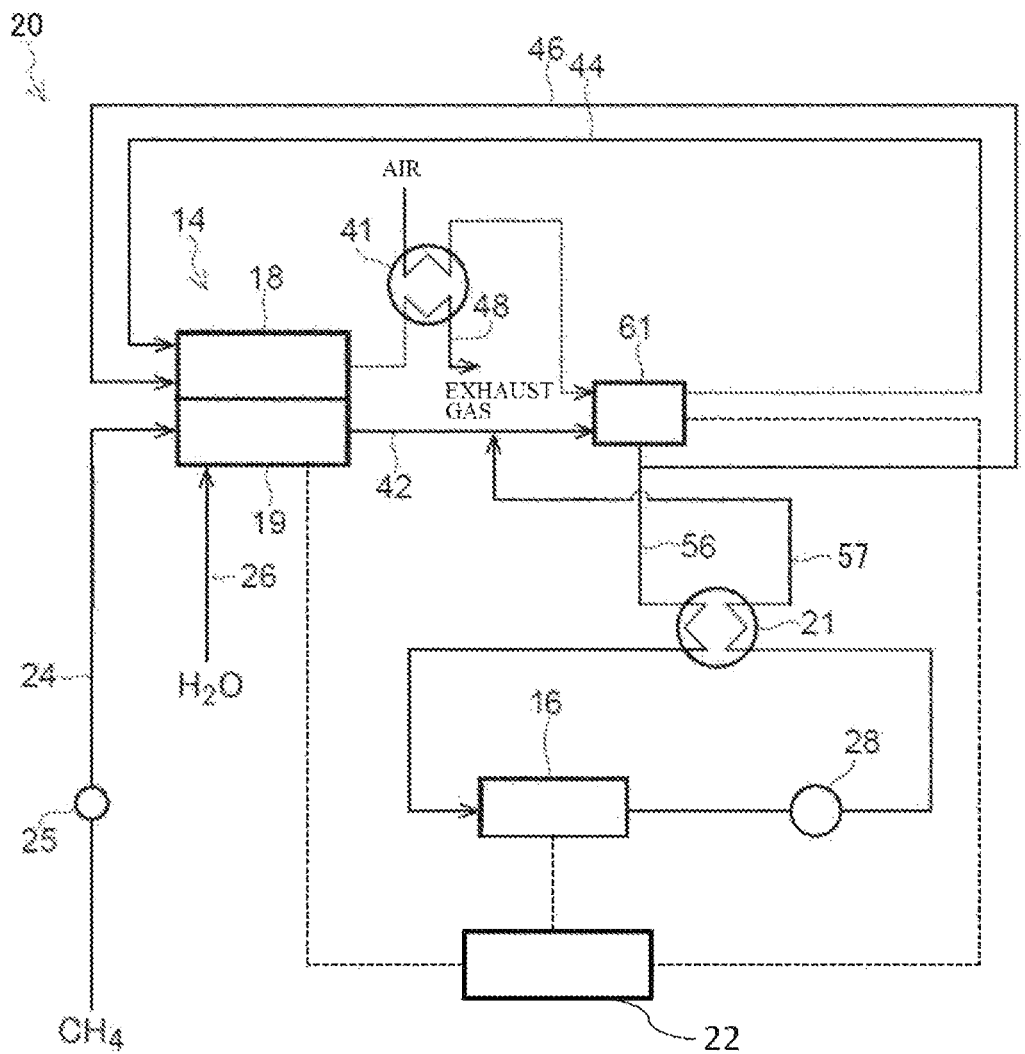
FIG. 2 is a schematic configuration view illustrating a fuel cell system according to a second embodiment.

The above-mentioned first embodiment provides a multistage fuel cell system, but the invention is not limited thereto, and may provide a circulation type fuel cell system. Hereinafter, a circulation type fuel cell system 20 according to one embodiment of the invention will be described with reference to FIG. 2. FIG. 2 is a schematic configuration view illustrating a fuel cell system according to a second embodiment.

As illustrated in FIG. 2, a fuel cell system 20 according to the second embodiment is a circulation type fuel cell system including an off-gas circulation passage 56 and a reprocessed off-gas circulation passage 57 that again supply to a fuel cell 61, an anode off-gas from which at least one of steam or carbon dioxide is at least partially removed. The fuel cell 61 has the same configuration as that of the above-mentioned first fuel cell 11 and thus the description thereof is omitted, and the description of the same configuration as in the first embodiment is omitted.

In the fuel cell system 20, a portion of an anode off-gas including an unreacted fuel gas discharged from the fuel cell 61 flows through an off-gas passage 46 and is supplied to a combustion unit 18, and the balance thereof flows through an off-gas circulation passage 56 and is supplied to an anode off-gas reprocessing unit 16. The anode off-gas reprocessing unit 16 at least partially removes at least one of steam or carbon dioxide from the anode off-gas supplied, thereby generating a reprocessed off-gas, and the reprocessed off-gas flows through a reprocessed off-gas circulation passage 57. The reprocessed off-gas flowing through the reprocessed off-gas circulation passage 57 is supplied into a fuel gas supply passage 42 and mixed with a fuel gas flowing through the fuel gas supply passage 42, and thereafter a mixed gas is supplied to the anode of the fuel cell 61, thereby allowing power generation to be performed. A configuration may be here adopted in which the reprocessed off-gas flowing through the reprocessed off-gas circulation passage 57 is supplied into a raw material gas supply passage 24, supplied together with a raw material gas to a reforming unit 19, and steam reformed, and thereafter a fuel gas generated is supplied to the anode of the fuel cell 61 through the fuel gas supply passage 42, thereby allowing power generation to be performed. A configuration in which the amount of steam removed in the anode off-gas reprocessing unit 16 is modulated or a configuration in which steam is not substantially removed and only carbon dioxide is substantially removed in the anode off-gas reprocessing unit 16 can be here adopted, thereby allowing a steam supply passage 26 to be omitted.

The fuel cell system 20 according to the embodiment includes the controlling unit 22 that modulates the reaction constant $K_{pa}$ of the above-mentioned reaction A with respect to the reprocessed off-gas discharged from the anode off-gas reprocessing unit 16, to 1.22 or more. Thus, carbon deposition hardly occurs in the reprocessed off-gas circulation passage 57, and carbon deposition after off-gas reprocessing can be suppressed.

The fuel cell system 20 can achieve a high power generation efficiency as compared with a circulation type fuel cell system in which an anode off-gas is recycled without any separation of steam and carbon dioxide. The reprocessed off-gas flowing through the reprocessed off-gas circulation passage 57 may be here supplied to the reforming unit 19 instead of the fuel gas supply passage 42.

A recycle blower 28 that allows for flow through of an anode off-gas is arranged in the reprocessed off-gas circulation passage 57. Such an arrangement of the recycle blower is not particularly limited, and the recycle blower may be arranged upstream of the anode off-gas reprocessing unit 16 or downstream of the anode off-gas reprocessing unit 16, and is preferably arranged between the heat exchanger 21 and the anode off-gas reprocessing unit 16 in a case in which the recycle blower is arranged upstream of the anode off-gas reprocessing unit 16, and is preferably arranged between the anode off-gas reprocessing unit 16 and the heat exchanger 21 in a case in which the recycle blower is arranged downstream of the anode off-gas reprocessing unit 16.

Third Embodiment

The fuel cell systems according to the above-mentioned first embodiment and second embodiment have a configuration in which the reprocessed off-gas is supplied to the fuel cell and utilized for power generation, but the invention is not limited to the configuration. For example, the fuel cell system of the invention may have a configuration in which the reprocessed off-gas flowing through the flow passage is supplied to the combustion unit of the fuel cell system, or may have a configuration in which the reprocessed off-gas is supplied to another combustion apparatus. This can lead to an enhancement in gas combustion efficiency as compared with a case in which the off-gas is supplied to the combustion unit or any combustion apparatus without any separation of steam and carbon dioxide.

Fourth Embodiment

The fuel cell system of the invention may have a configuration in which the reprocessed off-gas flowing through the flow passage is supplied to a synthesis apparatus, a synthesis plant, or the like in which hydrogen, carbon monoxide, or the like included in the reprocessed off-gas is used as a raw material. This can sometimes lead to an enhancement in gas combustion efficiency as compared with a case in which the off-gas is supplied to any synthesis apparatus, synthesis plant, or the like without any separation of steam and carbon dioxide.

The invention is not limited to the above-mentioned first embodiment to fourth embodiment, and is carried out by those skilled in the art, by combining each of the above-mentioned embodiments within the technical idea of the invention. The location of placement of the heat exchanger, any combination, and the like are also not limited to such embodiments.

EXAMPLES

Hereinafter, the invention will be more specifically described with reference to Examples, but the invention is not intended to be limited to the following Examples without departing from the gist thereof.

Examples 1 to 3 and Comparative Example 1

In Examples 1 to 3 and Comparative Example 1 below, each multistage fuel cell system having two fuel cell stacks (solid oxide type fuel cell stacks) and having a condenser as an off-gas reprocessing unit was used, and whether or not carbon deposition occurred in a flow passage (reprocessed off-gas passage) through which a reprocessed off-gas flowed was examined with respect to each configuration of such a fuel cell system. The temperature of the reprocessed off-gas flowing through the flow passage was raised in small steps from each condensation temperature in the condenser, and the reprocessed off-gas was supplied at 662° C. to the anode of a fuel cell stack at a post-stage.

(Conditions)

Temperature of two fuel cell stacks . . . 700° C.

Steam reforming temperature . . . 660° C.

Fuel gas . . . methane gas

S/C . . . 2.5

Entire fuel utilization . . . 90%

Fuel utilization of fuel cell stack at pre-stage . . . 60%

Fuel utilization of fuel cell stack at post-stage . . . 75%

Ratio of fuel cell stacks (pre-stage: post-stage) . . . 2:1

Condensation temperature in condenser . . . 60° C. (Example 1), 50° C. (Example 2), 40° C. (Example 3), and 25° C. (Comparative Example 1)

Pressure of reprocessed off-gas . . . 1 atm

Material of flow passage . . . stainless steel

The volume ratio of respective gases in the anode off-gas discharged from the anode of the fuel cell stack at the pre-stage and the volume ratio of respective gases in the reprocessed off-gas after off-gas reprocessing in the condenser were determined with respect to each of the fuel cell systems of Examples 1 to 3 and Comparative Example 1, and the reaction constant A and the reaction constant B were calculated. The presence of carbon deposition in the flow passage that allowed the reprocessed off-gas to flow therethrough was furthermore confirmed. The presence of carbon deposition was confirmed by whether or not the pressure loss occurred in the flow passage, with reference to deterioration in power generation performance. A case in which no pressure loss occurred was rated as "No carbon deposition", and a case in which the pressure loss occurred and further carbon deposition was confirmed by observing the surface in the flow passage and the surface inside the inlet of the fuel cell stack, was rated as "Carbon deposition".

The results are shown in Table 1. The reaction constant A and the reaction constant B in the off-gas discharged from the anode of the fuel cell stack at the pre-stage were also calculated.

TABLE 1

| (NL/min) | | Pre-stage exit | Example 1 60° C. After reprocessing | Example 2 Condensate on temperature 50° C. After reprocessing | Example 3 40° C. After reprocessing | Comparative Example 1 25° C. After reprocessing |
|---|---|---|---|---|---|---|
| Amount of gas | $H_2$ | 5.800 | 5.800 | 5.800 | 5.800 | 5.800 |
| | CO | 0.912 | 0.912 | 0.912 | 0.912 | 0.912 |
| | $H_2O$ | 13.096 | 2.431 | 1.373 | 0.775 | 0.316 |
| | $CO_2$ | 3.286 | 3.286 | 3.286 | 3.286 | 3.286 |
| | $CH_4$ | 0.002 | 0.002 | 0.002 | 0.002 | 0.002 |
| | Total | 23.095 | 12.431 | 11.373 | 10.775 | 10.316 |
| Compositional ratio | $H_2$ | 25.1% | 46.7% | 51.0% | 53.8% | 56.2% |
| | CO | 3.9% | 7.3% | 8.0% | 8.5% | 8.8% |
| | $H_2O$ | 56.7% | 19.6% | 12.1% | 7.2% | 3.1% |
| | $CO_2$ | 14.2% | 26.4% | 28.9% | 30.5% | 31.9% |
| | $CH_4$ | 0.01% | 0.02% | 0.02% | 0.02% | 0.02% |
| | Total | 100.0% | 100.0% | 100.0% | 100.0% | 100.0% |
| Reaction constant of reaction A | | 57.18 | 5.71 | 2.95 | 1.58 | 0.62 |
| Reaction constant of reaction B | | 91.25 | 49.11 | 44.93 | 42.57 | 40.76 |
| Carbon deposition | | | None | None | None | Deposited |

As shown in Table 1, no carbon deposition was confirmed in the flow passage with respect to Examples 1 to 3, whereas carbon deposition was confirmed in the flow passage with respect to Comparative Example 1.

[Results of Estimation of Reaction Constant of Reaction A]

The fuel utilization (Uf) of each fuel cell stack (solid oxide type fuel cell stack) and the condensation temperature in the condenser disposed in the fuel cell stack at the post-stage were changed in conditions represented below, and the reaction constant of the reaction A was estimated. The results are shown in Table 2.

(Conditions)
Temperature of fuel cell stack . . . 700° C.
Steam reforming temperature . . . 660° C.
Fuel gas . . . methane gas
S/C . . . 2.5
Fuel utilization of fuel cell stack . . . from 0% to 90%
Condensation temperature in condenser . . . from 25° C. to 60° C.

TABLE 2

| Uf | Reaction constant (Reaction A, before condensation) | Reaction constant at each condensation temperature (Reaction A, after condensation) | | | | | |
|---|---|---|---|---|---|---|---|
| | | 60° C. | 50° C. | 45° C. | 40° C. | 30° C. | 25° C. |
| 90% | 1300.5 | 31.4 | 16.2 | 11.9 | 8.69 | 4.66 | 3.40 |
| 80% | 291.4 | 12.1 | 6.3 | 4.6 | 3.35 | 1.80 | 1.31 |
| 70% | 115.2 | 7.6 | 3.9 | 2.9 | 2.11 | 1.13 | 0.82 |
| 60% | 57.2 | 5.7 | 3.0 | 2.2 | 1.58 | 0.85 | 0.62 |
| 50% | 32.0 | 4.7 | 2.4 | 1.8 | 1.29 | 0.69 | 0.50 |
| 40% | 19.2 | 4.0 | 2.1 | 1.5 | 1.10 | 0.59 | 0.43 |
| 30% | 12.1 | 3.5 | 1.8 | 1.3 | 0.98 | 0.52 | 0.38 |
| 20% | 7.8 | 3.2 | 1.7 | 1.2 | 0.88 | 0.47 | 0.35 |
| 10% | 5.1 | 3.0 | 1.5 | 1.1 | 0.82 | 0.44 | 0.32 |
| 0% | 3.3 | 2.8 | 1.4 | 1.0 | 0.77 | 0.41 | 0.30 |
| Carbon deposition basis | 1.22 | 1.22 | 1.22 | 1.22 | 1.22 | 1.22 | 1.22 |

It is presumed that carbon deposition in the flow passage that allows the reprocessed off-gas to flow therethrough can be suppressed by, for example, modulating the reaction constant of the reaction A to 1.22 or more by modulating the fuel utilization of each fuel cell stack, the condensation temperature in the condenser, or the like.

The disclosure of Japanese Patent Application No. 2018-204379 filed on Oct. 30, 2018 is herein incorporated by reference in its entity.

All documents, patent applications, and technical standards described herein are herein incorporated by reference, as if each individual document, patent application, and technical standard were specifically and individually indicated to be incorporated by reference.

REFERENCE SIGNS LIST 10, 20 . . . fuel cell system, 11 . . . first fuel cell, 12 . . . second fuel cell, 14 . . . reformer, 16 . . . anode off-gas reprocessing unit, 18 . . . combustion unit, 19 . . . reforming unit, 21, 41 . . . heat exchanger, 22 . . . controlling unit, 24 . . . raw material gas supply passage, 25 . . . blower, 26 . . . steam supply passage, 28 . . . recycle blower, 42 . . . fuel gas supply passage, 44 . . . air supply passage, 46, 52 . . . off-gas passage, 54 . . . reprocessed off-gas passage, 48 . . . exhaust passage, 56 . . . off-gas circulation passage, 57 . . . reprocessed off-gas circulation passage, 61 . . . fuel cell

The invention claimed is:

1. A fuel cell system comprising
a fuel cell including an anode and a cathode in which the anode is supplied with a fuel gas,
a fuel gas supply passage that is connected with the anode and is provided upstream of the fuel cell and allows the fuel gas to flow therethrough,
an off-gas reprocessing unit that is provided downstream of the fuel cell and that at least partially removes at least one of steam or carbon dioxide from an off-gas discharged from the fuel cell, wherein reprocessing corresponds to at least partially separating at least one of carbon dioxide or steam from the off-gas in the off-gas reprocessing unit,
a flow passage that is provided downstream of the off-gas reprocessing unit and that allows a reprocessed off-gas discharged from the off-gas reprocessing unit to flow therethrough, and
a controlling unit that modulates a reaction constant $K_{pa}$ of the following reaction A with respect to the reprocessed off-gas discharged from the off-gas reprocessing unit, to 1.22 or more by modulating at least one of a rate of removal of steam or a rate of removal of carbon dioxide in the off-gas reprocessing unit, wherein the flow passage is connected between the off-gas reprocessing unit and the fuel gas supply passage to supply the anode via the fuel gas supply passage with the reprocessed off-gas:

Reaction A: $CO + H_2 \leftrightarrow H_2O + C$ (Solid)

Reaction constant of Reaction A: $K_{pa} = P(H_2O)/[P(CO) \times P(H_2)]$ wherein $P(H_2O)$, $P(CO)$, and $P(H_2)$ represent respective partial pressures of $H_2O$, $CO$, and $H_2$ in the reprocessed off-gas.

2. The fuel cell system according to claim 1, wherein the controlling unit modulates a reaction constant $K_{pb}$ of the following reaction B with respect to the reprocessed off-gas discharged from the off-gas reprocessing unit, to 0.57 or more:

Reaction B: $2CO \leftrightarrow CO_2 + C$ (Solid)

Reaction constant of Reaction B: $K_{pb} = P(CO_2)/[P(CO)]^2$ wherein $P(CO_2)$ and $P(CO)$ represent respective partial pressures of $CO_2$ and $CO$ in the reprocessed off-gas.

3. The fuel cell system according to claim 2, wherein the controlling unit modulates the $K_{pb}$ to 0.57 or more by modulating at least one of the rate of removal of steam or the rate of removal of carbon dioxide in the off-gas reprocessing unit.

4. The fuel cell system according to claim 1, wherein the off-gas reprocessing unit comprises a condenser that removes steam of the off-gas by condensation.

5. The fuel cell system according to claim 4, wherein the controlling unit is capable of modulating at least one of a condensation temperature of the condenser or a pressure in the condenser.

6. The fuel cell system according to claim 1, wherein
the fuel cell is a first fuel cell, and
the fuel cell system further comprises a second fuel cell to which the reprocessed off-gas flowing through the flow passage is supplied.

7. The fuel cell system according to claim 1, wherein the reprocessed off-gas flowing through the flow passage is supplied to the fuel cell.

8. The fuel cell system according to claim 1, wherein the fuel cell system further comprises a reformer that reforms a raw material gas and generates a fuel gas, or the raw material gas is reformed in the fuel cell, thereby generating a fuel gas.

9. The fuel cell system according to claim 1, wherein the fuel cell system satisfies the following (1) or (2):
(1) the fuel cell system further comprises a reformer that reforms a raw material gas and generates a fuel gas, and at least one of a reforming temperature of the reformer or a fuel utilization of the fuel cell is controlled; or
(2) the controlling unit controls the fuel utilization of the fuel cell.

10. A method of reprocessing an off-gas, comprising using a fuel cell system comprising
a fuel cell including an anode and a cathode in which the anode is supplied with a fuel gas,
a fuel gas supply passage that is connected with the anode and is provided upstream of the fuel cell and allows the fuel gas to flow therethrough,
an off-gas reprocessing unit that is provided downstream of the fuel cell and that at least partially removes at least one of steam or carbon dioxide from an off-gas discharged from the fuel cell, wherein reprocessing corresponds to a process for at least partially separating at least one of carbon dioxide or steam from the off-gas in the off-gas reprocessing unit, and
a flow passage that is provided downstream of the off-gas reprocessing unit and that allows a reprocessed off-gas discharged from the off-gas reprocessing unit to flow therethrough,
wherein the flow passage is connected between the off-gas reprocessing unit and the fuel gas supply passage to supply the anode via the fuel gas supply passage with the reprocessed off-gas,
the method comprising a step of removing at least one of steam or carbon dioxide from the off-gas in the off-gas reprocessing unit, wherein by the step, a reaction constant $K_{pa}$ of the following reaction A with respect to the reprocessed off-gas discharged from the off-gas reprocessing unit is modulated to 1.22 or more:

Reaction A: $CO+H_2 \leftrightarrow H_2O+C$ (Solid)

Reaction constant of Reaction A: $K_{pa}=P(H_2O)/[P(CO) \times P(H_2)]$ wherein $P(H_2O)$, $P(CO)$, and $P(H_2)$ represent respective partial pressures of $H_2O$, $CO$, and $H_2$ in the reprocessed off-gas.

11. The method of reprocessing an off-gas according to claim 10, wherein a reaction constant $K_{pb}$ of the following reaction B with respect to the reprocessed off-gas discharged from the off-gas reprocessing unit, is modulated to 0.57 or more by removing at least one of steam or carbon dioxide from the off-gas in the off-gas reprocessing unit to modulate at least one of a rate of removal of steam or a rate of removal of carbon dioxide in the off-gas reprocessing unit:

Reaction B: $2CO \leftrightarrow CO_2+C$ (Solid)

Reaction constant of Reaction B: $K_{pb}=P(CO_2)/[P(CO)]^2$ wherein $P(CO_2)$ and $P(CO)$ represent respective partial pressures of $CO_2$ and $CO$ in the reprocessed off-gas.

12. The fuel cell system according to claim 2, wherein the controlling unit modulates the $K_{pa}$ to 1.22 or more by modulating at least one of the rate of removal of steam or the rate of removal of carbon dioxide in the off-gas reprocessing unit.

13. The fuel cell system according to claim 3, wherein the controlling unit modulates the $K_{pa}$ to 1.22 or more by modulating at least one of the rate of removal of steam or the rate of removal of carbon dioxide in the off-gas reprocessing unit.

14. The fuel cell system according to claim 2, wherein the off-gas reprocessing unit comprises a condenser that removes steam of the off-gas by condensation.

15. The fuel cell system according to claim 3, wherein the off-gas reprocessing unit comprises a condenser that removes steam of the off-gas by condensation.

16. The fuel cell system according to claim 14, wherein the controlling unit is capable of modulating at least one of a condensation temperature of the condenser or a pressure in the condenser.

17. The fuel cell system according to claim 15, wherein the controlling unit is capable of modulating at least one of a condensation temperature of the condenser or a pressure in the condenser.

* * * * *